United States Patent [19]

Robbins, III et al.

[11] Patent Number: 5,384,138
[45] Date of Patent: Jan. 24, 1995

[54] COLLAPSIBLE CONTAINERS

[75] Inventors: Edward S. Robbins, III, 459 North Ct., Florence, Ala. 35630; Ted Bell, Killen, Ala.

[73] Assignee: Edward S. Robbins, III, Muscle Shoals, Ala.

[21] Appl. No.: 719,711

[22] Filed: Jun. 26, 1991

Related U.S. Application Data

[63] Continuation-in-part of Ser. No. 576,080, Aug. 31, 1990, Pat. No. 5,224,613, and a continuation-in-part of Ser. No. 598,385, Oct. 18, 1990, Pat. No. 5,114,011, and a continuation-in-part of Ser. No. 706,853, May 29, 1991.

[51] Int. Cl.⁶ .................. B65D 81/32; B65D 81/34
[52] U.S. Cl. .................. 426/111; 215/1 C; 215/6; 215/10; 220/666; 426/120; 426/115; 426/124; 426/107; 426/113
[58] Field of Search .............. 215/1 C, 6, 10; 220/666; 426/111, 120, 115, 124

[56] References Cited

U.S. PATENT DOCUMENTS

| | | | |
|---|---|---|---|
| 693,959 | 2/1902 | Finley | 220/8 |
| 1,048,935 | 12/1912 | Brady . | |
| 2,575,893 | 11/1951 | Seaman | 150/2.1 |
| 2,784,882 | 3/1957 | Du Bois | 222/215 |
| 2,880,902 | 4/1959 | Owsen | 220/8 |
| 2,885,104 | 5/1959 | Greenspan | 206/219 |
| 2,886,084 | 5/1959 | Davison | 220/666 |
| 2,899,110 | 8/1959 | Parker | 215/1 C |
| 2,952,379 | 9/1960 | Potter | 220/6 |
| 2,985,915 | 5/1961 | Winstead | 18/19 |
| 3,058,627 | 10/1962 | Eskridge | 222/210 |
| 3,083,877 | 4/1963 | Gash | 222/107 |
| 3,143,429 | 8/1964 | Swanson et al. . | |
| 3,156,838 | 11/1964 | Melli | 222/83 |
| 3,163,544 | 12/1964 | Valyi . | |
| 3,179,323 | 4/1965 | Miller | 220/462 |
| 3,220,544 | 11/1965 | Lovell | 220/8 |
| 3,285,459 | 11/1966 | Gahm | 206/218 |
| 3,338,474 | 8/1967 | Olson | 222/92 |
| 3,367,380 | 2/1968 | Dickey | 150/1 |
| 3,434,589 | 3/1969 | Valtri et al. | 206/218 |
| 3,459,295 | 8/1969 | Cousar | 215/6 |
| 3,467,283 | 9/1969 | Kinnavy | 222/95 |
| 3,471,058 | 10/1969 | Latham et al. | 220/8 |
| 3,494,509 | 2/1970 | McGuire | 222/107 |
| 3,592,360 | 7/1971 | Aleck | 222/95 |
| 3,608,268 | 9/1971 | Lauritzen | 264/515 |
| 3,696,919 | 10/1972 | Miles | 215/6 |
| 3,727,803 | 4/1973 | Cobb | 222/215 |
| 3,784,039 | 1/1974 | Marco . | |
| 3,864,771 | 2/1975 | Bauer et al. . | |
| 3,872,994 | 3/1975 | Hyde | 220/1 R |
| 3,875,941 | 4/1975 | Adair | 128/278 |
| 3,939,887 | 2/1976 | Scarnato | 206/218 |
| 3,939,888 | 2/1976 | Scarnato | 206/215 |

(List continued on next page.)

FOREIGN PATENT DOCUMENTS

| | | |
|---|---|---|
| 84576 | 3/1977 | Australia . |
| 688612 | 6/1964 | Canada . |
| 0333075 | 9/1989 | European Pat. Off. ............ 220/666 |
| 1301970 | 8/1969 | Germany . |
| 2038069 | 2/1972 | Germany ........................... 426/111 |
| 7800287 | 8/1979 | Sweden . |
| 752750 | 7/1956 | United Kingdom .................... 215/6 |
| 1173893 | 12/1969 | United Kingdom .................... 220/8 |
| 2109247A | 6/1983 | United Kingdom . |
| 2138525A | 10/1984 | United Kingdom . |
| WO88/05014 | 7/1988 | WIPO . |
| WO90/08698 | 9/1990 | WIPO . |

Primary Examiner—Steven Weinstein
Attorney, Agent, or Firm—Nixon & Vanderhye

[57] ABSTRACT

A collapsible, thin wall, plastic container includes a closed end, an annular peripheral side wall and an open end, the peripheral side wall including a plurality of annular steps or shoulders for enabling controlled axial collapse of the container to a compact, collapsed condition wherein a plurality of substantially concentric folds surround a remaining uncollapsed portion of the container; and a removable cap securable to the open end, the cap having a sealed chamber formed therein for holding a predetermined amount of foodstuff material.

9 Claims, 5 Drawing Sheets

U.S. PATENT DOCUMENTS

| | | | |
|---|---|---|---|
| 4,079,111 | 3/1978 | Uhlig | 264/89 |
| 4,087,024 | 5/1978 | Martin et al. | 222/211 |
| 4,377,191 | 3/1983 | Yamaguchi | 426/111 |
| 4,397,643 | 8/1983 | Rygiel | 604/317 |
| 4,428,507 | 1/1984 | Sneider | 222/105 |
| 4,456,134 | 6/1984 | Cooper | 426/111 |
| 4,492,313 | 1/1985 | Touzani | 215/1 C |
| 4,591,060 | 5/1986 | Tsukada et al. | 215/1 C |
| 4,773,458 | 9/1988 | Touzani | 150/55 |
| 4,775,564 | 10/1988 | Shriver et al. | 428/35 |
| 4,776,972 | 10/1988 | Barrett | 215/10 |
| 4,805,799 | 2/1989 | Robbins, III | 220/403 |
| 4,846,376 | 7/1989 | Palmer | 222/190 |
| 4,865,211 | 9/1989 | Hollingsworth | 220/8 |
| 4,873,100 | 10/1989 | Dirksing et al. | 426/111 |
| 4,875,576 | 10/1989 | Torgrimson et al. | 206/218 |
| 4,925,055 | 5/1990 | Robbins, III et al. | 220/403 |
| 4,979,628 | 12/1990 | Robbins, III | 215/1 |
| 5,002,193 | 3/1991 | Touzani | 215/100 |

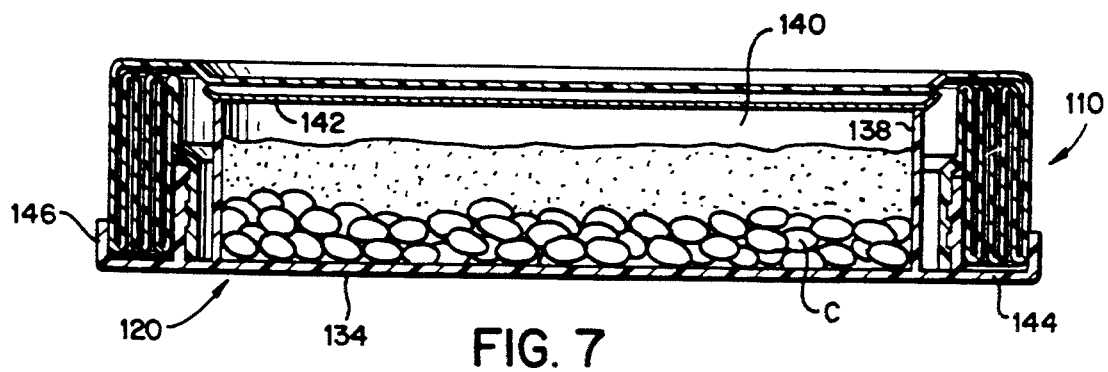
FIG. 7
FIG. 8
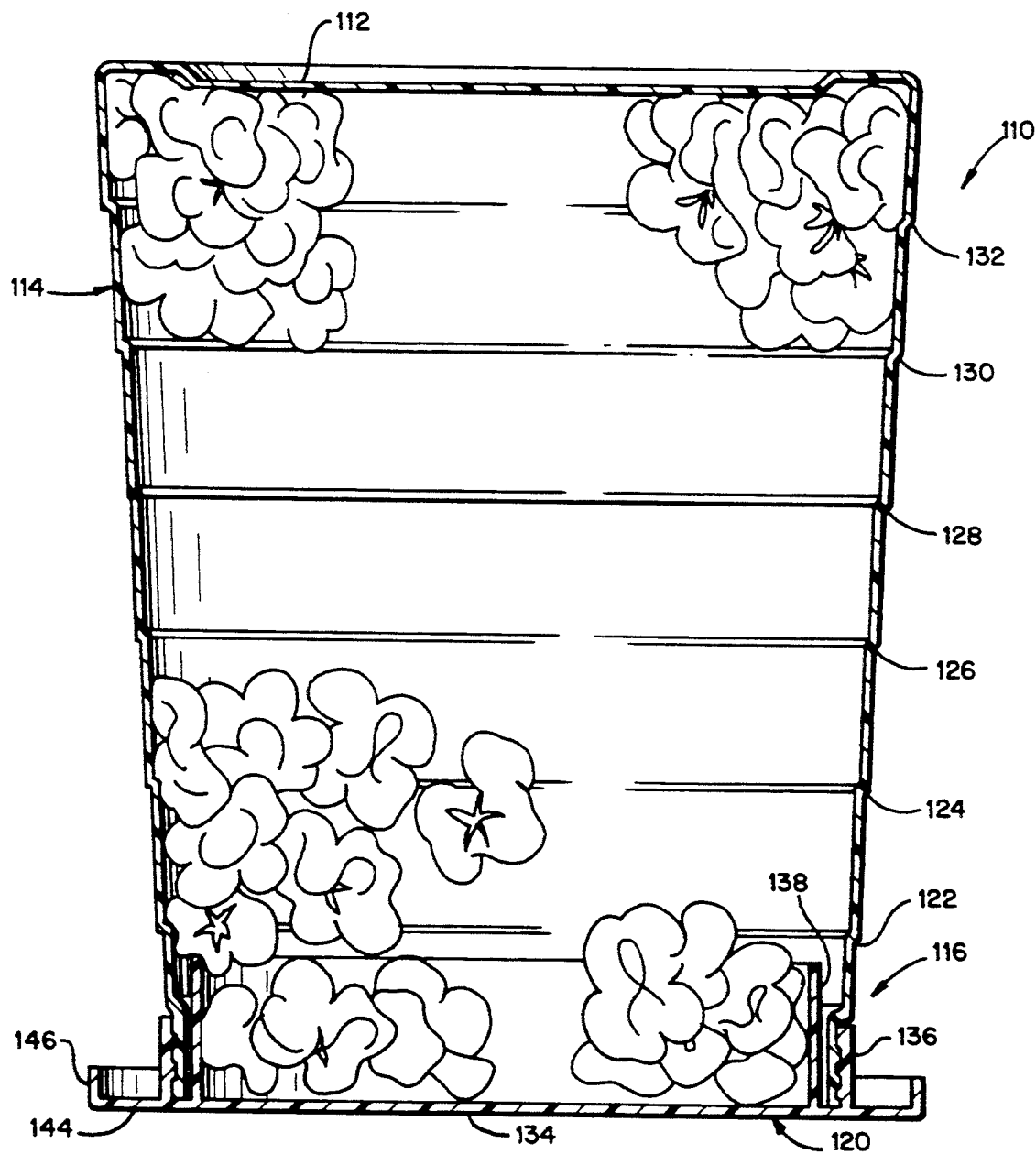

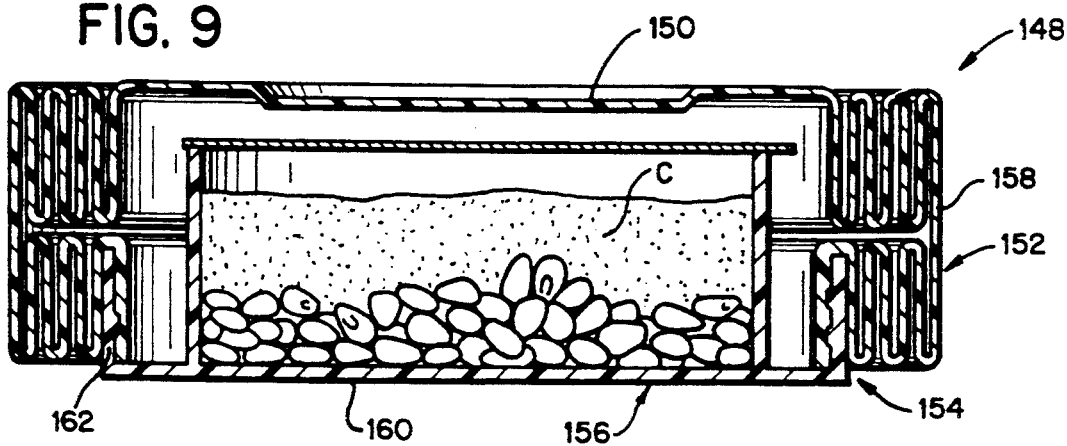
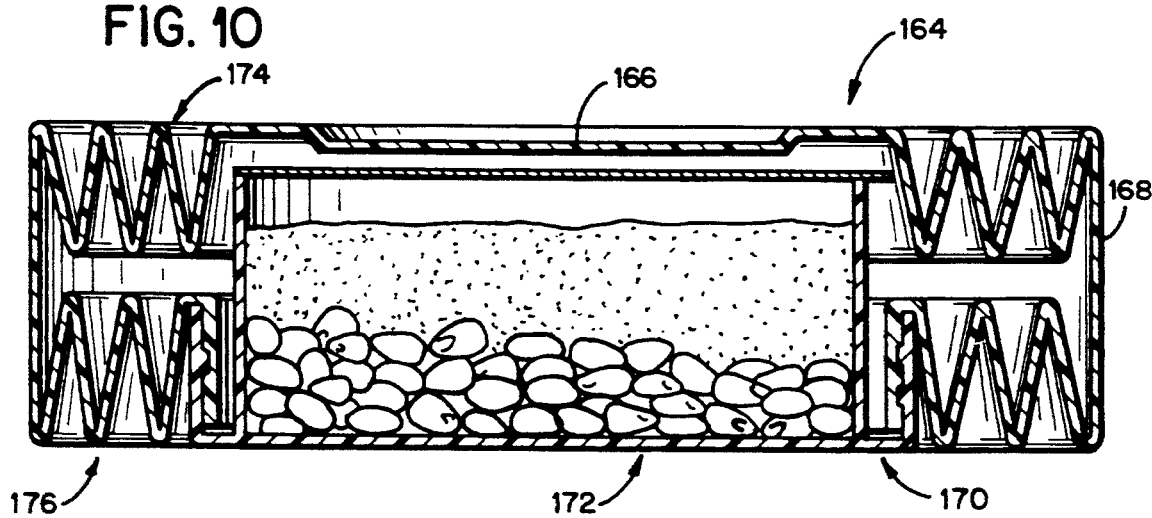
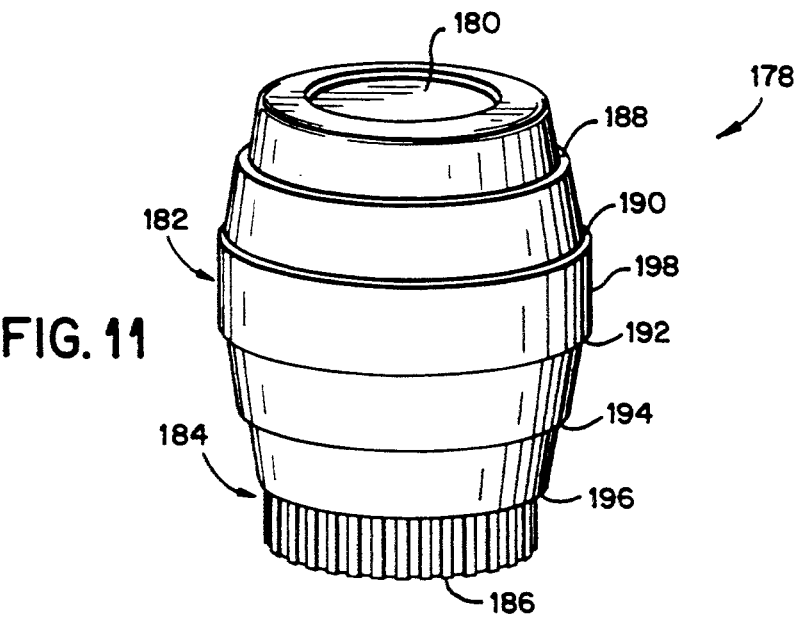

COLLAPSIBLE CONTAINERS

This application is a continuation-in-part of each of application Ser. No. 07/576,080 filed Aug. 31, 1990, now U.S. Pat. No. 5,224,613, issued Jul. 6, 1993; application Ser. No. 07/598,385 filed Oct. 18, 1990, now U.S. Pat. No. 5,114,011, issued May 1992; and application Ser. No. 07/706,853 filed May 29, 1991, both of which are expressly incorporated herein by reference.

BACKGROUND AND SUMMARY OF THE INVENTION

This invention relates generally to plastic bottle or container constructions, and particularly to thin walled bottles or containers which are collapsible and foldable to a compact configuration, but fully capable of standalone use. These containers are particularly advantageous for use with frozen and non-frozen (e.g., powdered) concentrates, drink mixes and/or other foodstuffs.

In the container industry, there are a number of known applications for relatively thin, flexible bottles or containers, some of the more well known of which relate to the shipment and retail sale of beverages such as milk, water, juice, etc., as well as liquid or powdered cleaners, detergents and the like.

It is often the case that such containers must be shipped over considerable distances to distributors who fill and then ship the filled containers to retail concerns. During the initial shipment to distributors, the empty containers, for example one gallon containers, take up so much space that, from a volume standpoint, the manufacturer is shipping mostly air.

At the same time, there is great concern in the environmental arena for plastic materials which for the most part are not biodegradable, and which therefore pose significant disposal problems, particularly in light of the ever expanding utilization of plastics in virtually every area of technology. The problem is especially acute in the container industry, not only with respect to the amount of plastic disposed of, but also the sheer volume of such waste.

This invention seeks to alleviate both of the above described concerns by:

1) providing a plastic bottle or container constructions which, in some instances, require only approximately one half of the plastic currently used in most plastic containers, particularly those larger containers, i.e., one gallon or larger, which typically carry milk, water, juice, detergents (liquid or powder) and other liquids and/or particulates, but which are fully capable of stand-alone use; and 2) shaping the containers in such a way as to facilitate machine-aided, controlled collapse and folding to a compact size which results in a two or more to one increase in shipping and inventory capacity and, by facilitating non-machine-aided (or random) collapse by the consumer after use, achieving similar orders of magnitude reduction in post-consumer waste volume.

A further concern addressed by this continuation-in-part application relates to the present practice of shipping/selling powdered concentrates or mixes (for beverages such as diet drinks and the like) in one container and mixing it in another. In other words, the present practice in this area requires two containers, with attendant manufacturing, shipping and disposal costs and related problems.

The invention disclosed in this continuation-in-part application provides, in one embodiment, a one-container system where, for example, powdered concentrate is held within a cap applied to the container. The assembly is shipped/sold and later mixed by the consumer in a single container which incorporates all of the advantages of the invention disclosed in the above identified parent applications.

In another embodiment, a one container system is provided for microwavable popcorn wherein unpopped corn, also held within the cap, is shipped and sold in a collapsed container which expands to full size as a result of the popping action of the corn when placed in a microwave oven.

After use, the containers in both embodiments may easily be collapsed in a random fashion for efficient disposal.

For purposes of this invention, the term "container" refers to plastic containers or bottles having shapes as disclosed herein. In accordance with a preferred embodiment of the invention, a thin walled plastic container is manufactured by an extrusion or injection blow molding process, incorporating a thin walled construction which permits the normally self-supporting container to be collapsed and a portion or portions concentrically folded to provide a compact, nestable and/or stackable container for efficient shipment as well as disposal.

The container in the first above mentioned exemplary embodiment, generally has a bottom wall, a peripheral side wall, and an upper, open end serving as a discharge opening, closed by, for example, a removable screw cap.

The container side wall is provided with peripheral, vertically spaced steps or shoulders with or without a slightly tapered peripheral wall, which facilitate axial collapse and subsequent concentric folding of one or more portions of the side wall to provide a collapsed and folded container with at least two "layers" of side wall arranged in a zig-zag or S-shaped configuration, in generally surrounding relationship to the adjacent uncollapsed portion of the side wall.

The container side wall may also be formed with a smooth, tapered or even straight peripheral side wall and nevertheless collapsed and folded as will be explained further herein.

It will be appreciated that the above described steps or shoulders (or smooth wall tapers) can be designed to increase or decrease the diameter of the peripheral side wall. The direction of diameter reduction will determine the type of concentric fold which will be effected upon axial collapse of the container. If the diameter increases from top to bottom, outward and upward folds will be created, as disclosed in U.S. Pat. No. 5,224,613. If, on the other hand, the diameter decreases from top to bottom, then outward and downward folds will be created, as disclosed in parent application Ser. No. 07/706,853.

After manufacture, the containers are collapsed in a controlled manner by apparatus similar to that disclosed in U.S. Pat. No. 5,224,613. This provides a uniform, attractive appearance, and facilitates, in this case, the use of caps with integral foodstuff holding chambers. After use, however, the container is intended to be collapsed in a random manner by the consumer to achieve post-consumer waste reduction. It will be readily evident that for disposal purposes, controlled collapse is unnecessary, particularly since the volume reduction is similar whether or not collapsing is controlled.

It is also a feature of the invention, that the container as a whole as well as the axial extent of remaining unfolded portions are sized to permit the holding within the cap chamber of a predetermined amount of, for example, powdered concentrate or drink mix or other foodstuff material. In other words, the cap chamber wall may have an axial extent substantially equal to the axial extent of the unfolded portions of the container (which, in turn, may also be substantially equal to the axial extent of each fold) so that the cap provides axial support for the collapsed container, which is particularly advantageous for stacking.

Accordingly, in one exemplary embodiment, the powdered drink mix or concentrate is held within a chamber provided within a removable screw cap. More specifically, the screw cap has an interior peripheral skirt extending downwardly into the container, a lower open end of which is closed by a removable seal. The axial extent of the skirt corresponds to, or is shorter than, the unfolded portion of the container, so that in some cases the lower edge of the peripheral skirt engages the container bottom wall when the container is in the collapsed condition. As already noted, this arrangement provides good support for the container, particularly when stacked with other similar containers for shipment and/or storage.

In another exemplary embodiment, a predetermined amount of unpopped corn is held within a cap chamber which lies within the remaining uncollapsed portion of the container.

In both embodiments, the overall volumetric capacity of the container is selected to accommodate the corresponding volume of mixed drink (with liquid, such as water, added) or popped corn.

In a preferred arrangement, an additional volumetric capacity may be provided in the first described embodiment to permit shaking of the contents to insure complete mixing. As an example, the container may be sized to hold a half gallon of diet drink mix with an additional 20% volumetric capacity added for mixing purposes. Such additional volume may or may not be desirable and/or cost effective in the popcorn container embodiment.

It will be appreciated from the above that the subject matter of this continuation-in-part application permits compact shipment of containers from manufacturers to distributors/fillers, and equally compact shipment with concentrate added to retailers. Of course, inventory and display at the point of sale are also facilitated by the compact arrangement. At the same time, the invention eliminates the need for separate containers for dispensing the ultimate product during consumer use, and effects significant waste volume reductions after use.

Thus, in one aspect, the present invention provides a collapsible, thin wall, plastic container comprising a closed end, an annular peripheral side wall and an open end, the peripheral side wall including means for enabling axial collapse of the container to a compact, collapsed condition wherein a plurality of substantially concentric folds surround a remaining uncollapsed portion of the container; and a removable cap securable to the open end, the cap having a sealable chamber formed therein.

Other objects and advantages will become apparent from the detailed description which follows.

BRIEF DESCRIPTION OF THE DRAWINGS

FIG. 7 is a side sectional view of a container and tray assembly in accordance with a sixth exemplary embodiment of the invention;

FIG. 8 is a side sectional view of the container and cap assembly illustrated in FIG. 7 but in a fully expanded position;

FIG. 9 is a side sectional of a container and removable cap assembly in accordance with a seventh exemplary embodiment of the invention;

FIG. 10 is a side sectional view of a container and removable cap assembly in accordance with an eighth exemplary embodiment of the invention; and FIG. 11 is a perspective view of a container and removable tray assembly of the type illustrated in FIG. 10, but in a fully expanded state.

DETAILED DESCRIPTION OF THE DRAWINGS

Figure 1:
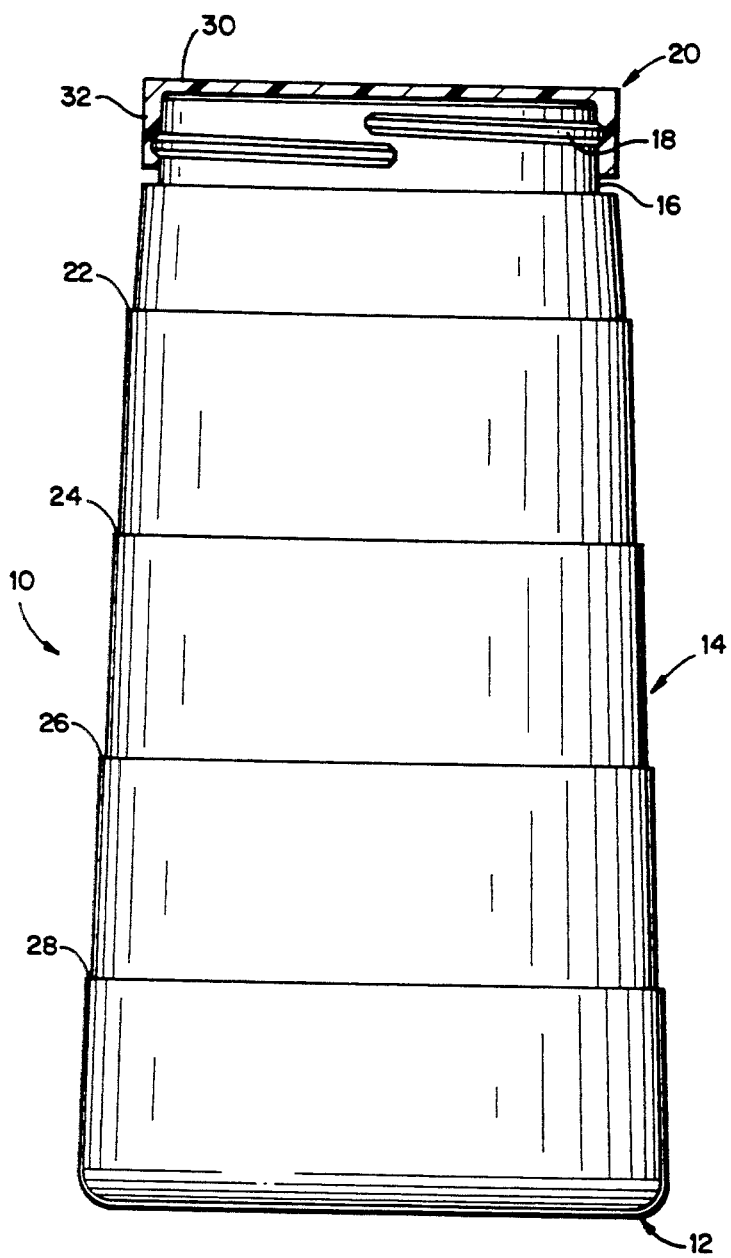
FIG. 1 is a side view of a container in accordance with one exemplary embodiment of the invention with a removable cap shown partly in section.
Figure 2:
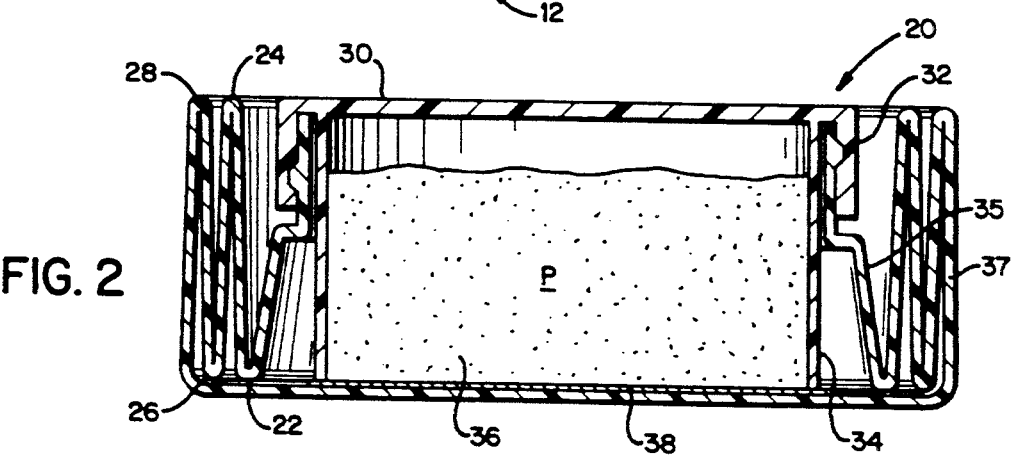
FIG. 2 is a side section of the container and cap assembly shown in FIG. 1, but in a collapsed condition.

With reference to FIGS. 1 and 2, a thin wall plastic container 10 in accordance with one exemplary embodiment of the invention includes a substantially flat bottom wall 12, a peripheral side wall 14, and an upper open end 16 provided with screw threads 18 adapted to receive a removable screw cap 20.

In a preferred embodiment, the bottle or container is a unitary structure formed by extrusion or injection blow molding or other conventional plastic forming processes. The finished side wall 14 has a preferred thickness range of between 0.002 and 0.012 of an inch, (with a preferred range of about 6 mil) while the upper open end 16 and particularly in the area of screw threads 18, has a preferred thickness of between about 0.010 and 0.090 of an inch. The thickness in the neck portion may vary considerably depending on the manufacturing process. For example, if the neck area is blow molded with the remainder of the container, its thickness may be in the area of 0.025 inch, while if the upper threaded portion of the neck is compression molded, the thickness in this area may be 0.090 inch.

The bottom wall 12 has a thickness substantially the same as the side wall 14, but may be slightly thicker, i.e., up to about 0.025 inch, as a result of pinching off of the parison prior to blowing. Other thickness ranges are possible for various container portions, the significant criteria being that the bottle be normally self-supporting, i.e., capable of stand-alone use, and be of sufficient strength but easily collapsed and folded in the manner described below.

Suitable semi-rigid (or more flexible) plastics including high density polyethylene (HDPE) and PET may be used for the container, but linear low density polyethylene (LLDPE) is presently preferred.

In this first exemplary embodiment, the peripheral side wall 14 of the container is provided with a series of vertically (i.e., axially) spaced annular steps or shoulder 22, 24, 26 and 28 to facilitate the collapsing and folding operation with the apparatus disclosed in U.S. Pat. No. 5,224,613. The thickness of the container side wall does not vary appreciably in the areas of these steps or shoulders.

As can be seen from FIG. 1, the side wall 14 of the container tapers slightly outwardly from top to bottom and the steps or shoulders 22, 24, 26 and 28 are located axially along the side wall 14 so as to correspond to, and in fact form, the four folds in the collapsed container as described below. The tapered side wall 14 and steps or shoulders may be used separately or in combination to achieve the controlled side wall collapsing/folding operation. Depending on the size of the container and the desired degree of compaction or collapse, a fewer or greater number of concentric folds may be formed in the container side wall.

The cap 20 includes a top wall 30, an outer depending skirt portion 32 provided with interior screw threads which cooperate with the mating threads 18 on the container body 10. The cap 20 is also provided with an interior depending skirt 34 which projects downwardly into the container body 10 as best seen in FIG. 2. The skirt 34 thus forms a chamber 36 which is closed by a removable seal 38 which may be, for example, adhesively secured to the lowermost edge of the skirt 34. The chamber 36 has a volumetric capacity sufficient to hold a predetermined quantity of powdered concentrate or drink mix (or other foodstuff material) appropriate for the volumetric capacity of the container 10.

In this first exemplary embodiment, the axial extent of the interior skirt 34 of the cap 20 also corresponds to a remaining unfolded portions 35, 37 of the container 10, and to the axial extent of each of the concentric folds, so that when in the collapsed condition, the lower edge of the skirt 34 engages the bottom wall 12 of the container thus providing support for the container. This is particularly advantageous when a plurality of such collapsed containers are stacked for shipment and/or storage.

Figure 3:
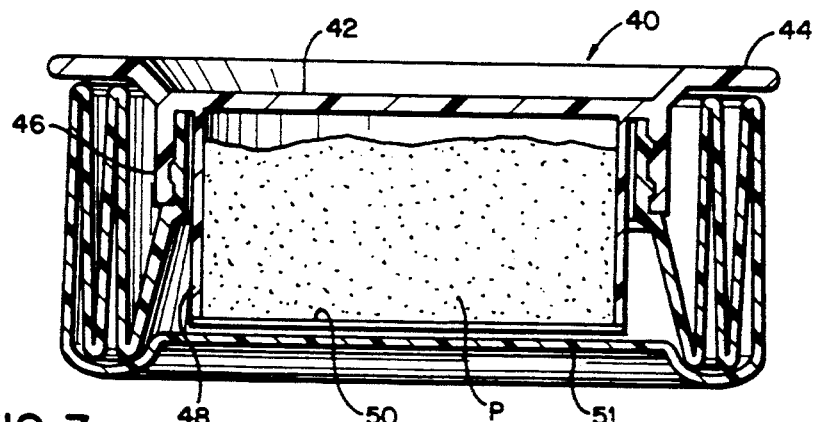
FIG. 3 is a side sectional view of a container and removable cap assembly in accordance with a second exemplary embodiment of the invention.

With reference now to FIG. 3, a modified cap 40 has a centrally depressed top wall 42 and a raised peripheral portion 44 which extends radially outwardly a distance substantially equal to or slightly greater than the radial extent of the four concentric folds illustrated in the collapsed container. Otherwise, construction of the cap is similar to that illustrated in FIG. 2 in that a radially outer peripheral skirt 46 is provided with interior threads to cooperate with exterior threads on the upper end of the container, and an inner depending skirt 48 extends downwardly into the container with its lower open end being closed by a removable seal 50, lying adjacent a recessed portion 51 of the container bottom wall. The chamber 52 defined by the container top wall 42, skirt 48 and seal 50 contains a powdered concentrate or drink mix P. With this arrangement, the peripheral flange 44 not only protects the concentric folds of the container particularly when stacked, but also facilitates removal of the cap from the container by the consumer.

In addition, the flange 44 serves to support an overlying container in a stack.

Figure 4A:
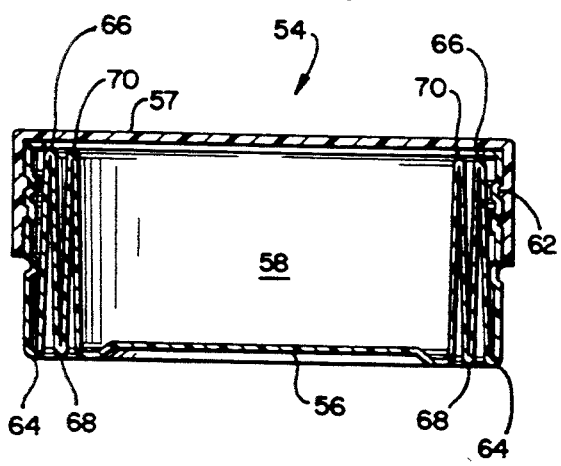
FIG. 4a is a cross-sectional elevational view of the container embodiment shown in FIG. 4, but depicted in a collapsed state.
Figure 4:
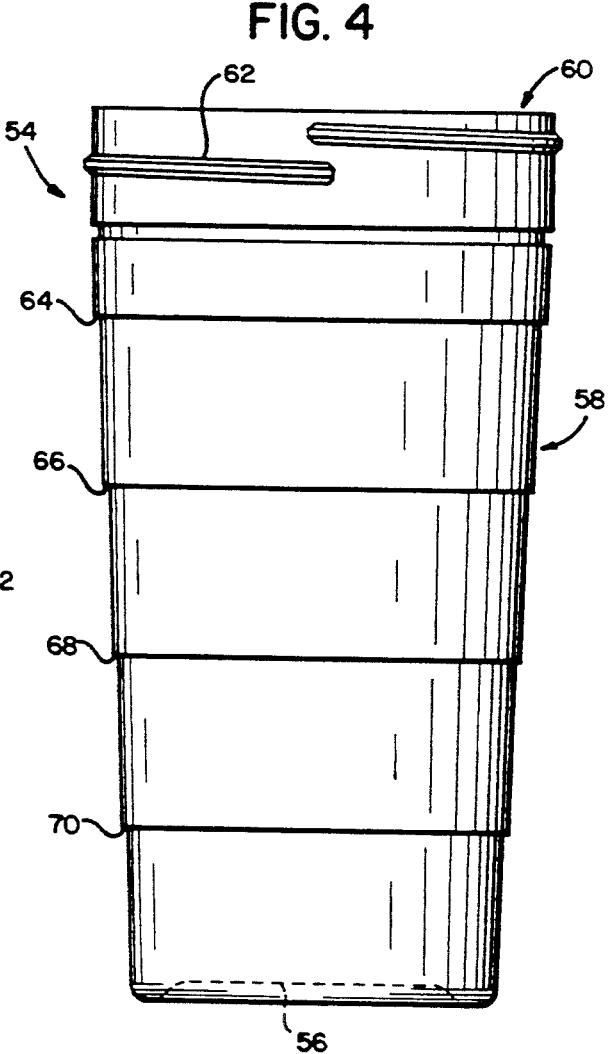
FIG. 4 is a side view of a container body in accordance with a third exemplary embodiment of the invention.

With reference now to FIG. 4, an alternative container construction 54 is shown, the container including a recessed bottom wall 56, a peripheral side wall 58 and an upper open end 60 closed by a removable screw cap 57 (see FIG. 4a). The container upper end 60 is provided with screw threads 62 adapted to cooperate with threads on the cap 57. In this embodiment, a series of annular steps or shoulders 64, 66, 68 and 70 serve to decrease the diameter of the container from top to bottom so that a series of concentric outwardly and downwardly folded portions can be created upon axial collapse of the container in the manner disclosed in co-pending application Ser. No. 07/706,853 filed May 29, 1991, and shown in accompanying FIG. 4a. As explained in that application, folding may be achieved with apparatus as shown in U.S. Pat. No. 5,224,613, with suitable modifications to form a "reverse" fold as described herein and in the former application.

Figure 5:
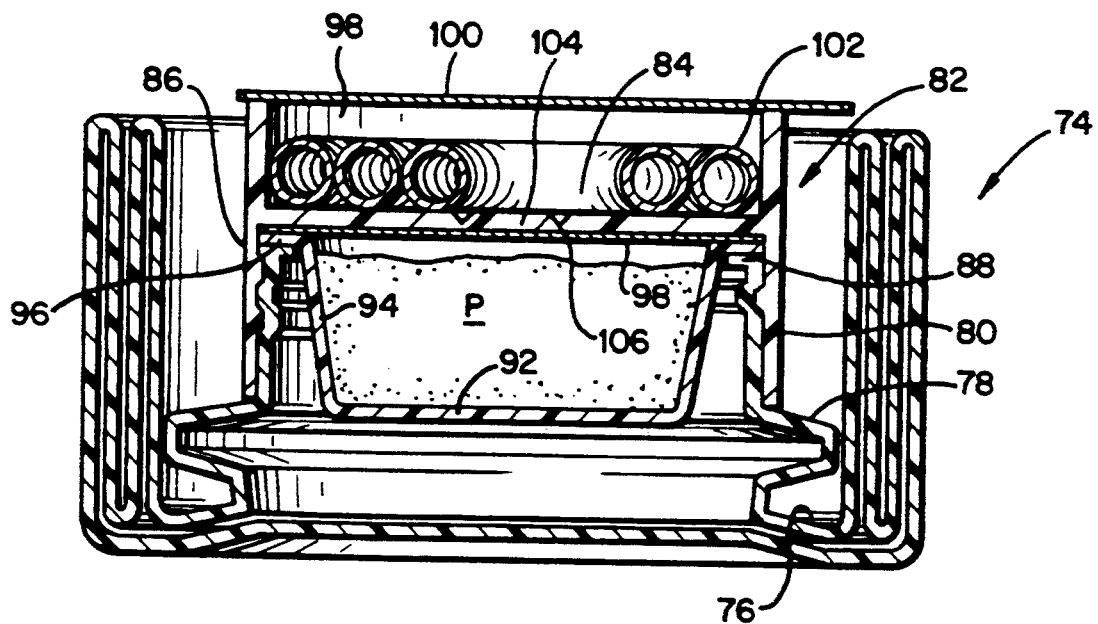
FIG. 5 is a collapsed side section of a container and cap assembly in accordance with a fourth exemplary embodiment of the invention.

With reference now to FIG. 5, an alternative construction for the container illustrated in FIGS. 1 and 2 includes a container 74 which is similar in construction to the container illustrated in FIG. 1 with the exception that the upper open end of the container is provided with a radially inwardly directed shoulder portion 76 and, immediately thereabove, a radially outwardly directed hollow flange 78. A neck portion 80 of the container is provided with exterior through threads for mating engagement with threads provided on the interior of a screw cap 82. In this embodiment, the cap 82 has a recessed top wall 84 and an annular peripheral side wall 86 extending above and below the recessed top wall 84. Below the top wall 84, the inner surface of the peripheral side wall 86 is provided with screw threads for mating engagement with the threads provided on the neck portion 80 of the container. An upper flange 88 of the container supports a concentrate cup 90 which is itself provided with a bottom wall 92, a tapered side wall 94, an upper radially outwardly extending flange 96 and a removable seal 98 which closes the otherwise open end of the cup 90. The cup 90 is adapted to hold a predetermined amount of powdered concentrate P or drink mix (or other foodstuff material) within the cup for mixing with the contents of the container 74.

The upper radially outwardly directed flange 96 of the cup 90 is adapted to seat on the flange 88 of the container, sandwiched between the flange 88 and the recessed top wall 84 of the screw cap 82.

That portion of the peripheral side wall 86 of the screw cap 82 which extends above the recessed top wall 84 forms a chamber 98 which is closed at its otherwise open upper end by a peel-off seal 100. This chamber is utilized to hold a coiled straw 102 for use with the container. To further facilitate such use, an annular break-out portion 104 as defined, for example, by an annular score line 106, is provided within the recessed top wall 84 of the cap 82 to permit insertion of the straw within the container after the cup 90 has been removed.

In use, it will be appreciated that the screw cap 82 may be removed from the container, followed by removal of the concentrate cup 90 and the pouring of the contents thereof into the container 74. Thereafter, the screw cap 82 may be reapplied to the container (without the cup 90) and the contents thoroughly mixed by shaking in the usual manner. The straw 102 can then be inserted through the recessed top wall 84 of the cap via removable portion 104 (after having removed the seal 100).

Figure 6:
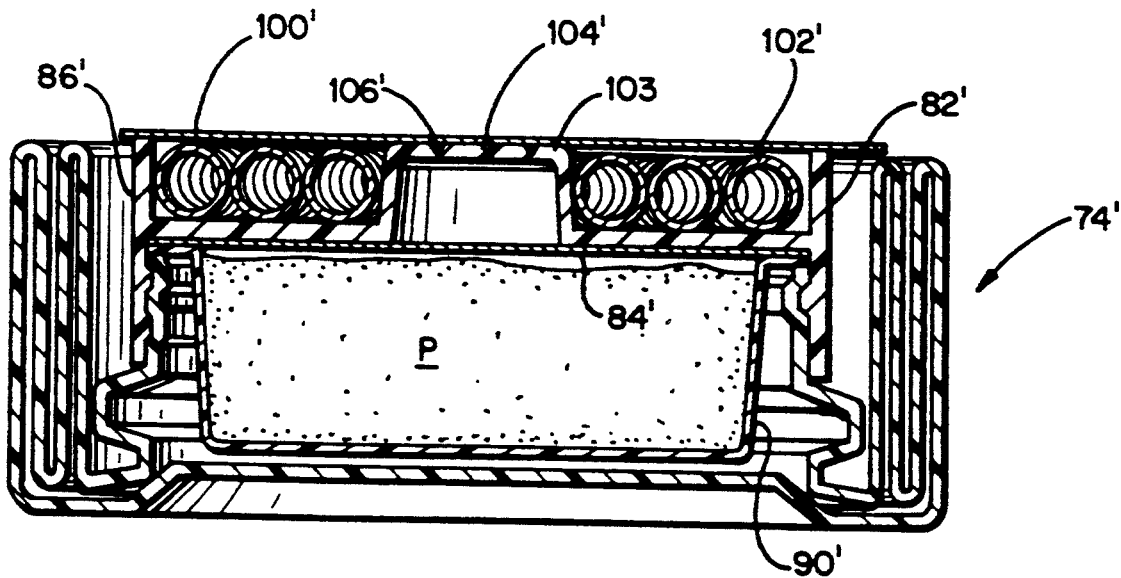
FIG. 6 is a side sectional view of a container and removable cap assembly in accordance with a fifth exemplary embodiment of the invention.

In FIG. 6, a modified version of the cap 82 is illustrated wherein the recessed top wall 84' of the cap 82' has a central portion 103 raised substantially to the height of the peripheral side wall 86' so that the straw 102' can be coiled about the recessed top wall 84' between the peripheral side wall 86' and the raised center portion 103. As in the previously described cap, a breakout portion 104', defined by score line 106', may be provided for facilitating the insertion of the straw 102' through the cap after the concentrate cup has been removed.

It will also be seen that in FIG. 6, the axial extent of cup 90' is substantially equal to the axial extent of the upper unfolded portion of the container so that, due to the overall flexibility of the container, cup 90' will provide axial support for the container in the collapsed condition.

It will be appreciated that the cap structures 82 and 82' as illustrated in FIGS. 5 and 6 may be utilized with reverse fold containers of the type illustrated in FIG. 4 as well.

Turning now to FIG. 7, another exemplary embodiment of the invention is illustrated which is particularly designed to accommodate microwavable popcorn. In this construction, a collapsible container 110 generally similar to the collapsed container shown in FIG. 3, is essentially inverted so that the removable screw cap serves as a supporting tray 120, at least until the corn is in a popped state as will be described further hereinbelow. For convenience, the construction shown in FIGS. 7 and 8 will be described as depicted therein, with the usual reference to top and bottom, etc. It will be appreciated, however, that the arrangement as shown is similar to the construction illustrated in FIGS. 1 and 3 but inverted relative thereto. Accordingly, the container 110 is of thin wall, collapsible construction as described hereinabove, and includes a recessed top wall 112, a peripheral side wall 114 and a lower open end 116 which is provided on its exterior surface with a threaded configuration adapted to receive corresponding threads on a removable tray 120. The thin wall container body which, as shown in FIG. 8, decreases slightly in diameter from top to bottom, is provided with a series of axially spaced ribs or shoulders 122, 124, 126, 128, 130 and 132. These annular shoulders or steps serve to facilitate axial collapse and controlled folding into a series of six concentric folds as shown in FIG. 7.

The removable tray 120 is formed with a bottom wall 134 and an intermediate upstanding skirt portion 136 which is provided on its interior surface with screw threads adapted to mate with the screw threads provided on the lower open end 116 of the container body 110. The tray 120 is also provided with an interior upstanding skirt portion 138 which extends upwardly into the container 110 to form a chamber 140 closed at its upper end by a removable seal 142. The chamber 140 is adapted to hold a predetermined amount of popping corn C in a pre or unpopped state.

In the above described embodiment, the interior upstanding skirt 138 extends upwardly into the container substantially to the height of the remaining unfolded portion of the container so as to provide support for the container in the collapsed state, and particularly during stacking.

The removable tray 120 is further provided with a radially outwardly extending flange 144 with an upturned radially outermost lip 146. The flange and lip 144, 146 accommodate the multiple concentric folds in the thin wall container in the collapsed state as best seen in FIG. 7.

In use, the collapsed container 110 as shown in FIG. 7 is grasped by the user and the tray 120 with the unpopped corn is removed from the container. The seal 142 is thereafter removed from the tray 120 and the tray is then screwed back into place within the container bottom 116. The collapsed container may then be placed in a microwave oven and the corn popped in the usual manner. The popping action will cause the container 110 to expand to its volumetric capacity as shown in FIG. 8. Upon completion of the corn popping stage, the entire container may be inverted from the position shown in FIG. 8 and the tray 120, which now serves as a removable screw cap, may be removed from the container, leaving an open bag of popped corn for use by the consumer.

With reference to FIGS. 9–11, a further embodiment of the invention is described which is also particularly adapted for use as microwave popcorn containers.

With reference now to FIG. 9, container 148 includes a closed top wall 150 and a peripheral side wall 152 which extends downwardly to a lower open end 154 closed by a removable tray 156. In this embodiment, a lower and upper series of six concentric folds may be formed in the container on either side of a central portion 158 of the side wall. It will be appreciated that these folds are formed in a container shaped similarly to that shown in FIG. 11, although the container in FIG. 11 is not provided with a sufficient number of annular steps or shoulders to form the series of six folds shown in FIG. 9. In any event, the double axial fold arrangement illustrated in FIG. 9 provides even greater expansion capacity for the container. The formation of these folds can be accomplished by first forming a lower or upper series of folds utilizing apparatus similar to that disclosed in the above identified U.S. Pat. No. 5,224,613. The remaining series of folds may be formed by inverting the container and utilizing the same apparatus, or using apparatus specifically set up to form upper and lower series of concentric folds.

The removable tray 156 as shown in FIG. 9 is substantially identical to the removable tray 120 illustrated in FIGS. 7 and 8, with the exception that the top wall 160 extends radially only to the outer peripheral skirt 162 and does not radially cover the plurality of concentric folds. It will be understood, of course, that a cap similar to that illustrated in FIGS. 7 and 8 may also be utilized in the container construction illustrated in FIG. 9. In use, it will be appreciated that during popping, the container 148 will expand upwardly to its full height, with the diameter increasing progressively upwardly to the center portion 158 of the side wall and then decreasing progressively to the closed top wall 150 (similar but not identical to the container illustrated in FIG. 11).

With respect to FIG. 10, a container 164 is shown to include a closed top wall 166, a peripheral side wall 168 and an open lower portion 170 closed by a removable screw cap 172. The container and cap construction of the embodiment illustrated in FIG. 10 is substantially the same as that described above with respect to FIG. 9 with the exception that the series of upper and lower concentric folds 174, 176, respectively, are more loosely formed, adding to the overall diameter of the container assembly. This is merely intended to illustrate that as the angle of the individual folds becomes wider, the overall bulge or diameter of the container in the collapsed condition is increased.

With reference to FIG. 11, a container 178 is illustrated which includes a closed top wall 180, a peripheral side wall 182 and an open lower end 184 closed by a removable screw cap 186. The peripheral side wall 182 of the container is shown to include annular steps or shoulders 188, 190, 192, 194 and 196. The diameter of the container increases progressively from the top wall 180 to the middle portion 198 of the peripheral side wall and then decreases progressively from the middle portion 198 to the lower open portion 184. As already noted above, this type of arrangement leads to a collapsed configuration similar to that illustrated in FIGS. 9 and 10. As also noted above, in conjunction with the embodiment illustrated in FIGS. 7 and 8, once the corn inside the container has fully popped, the container 178 may be inverted and the removable screw cap 186 removed leaving an open container of popped popcorn for the user.

In all of the above described embodiments, the thin walled containers and associated cap assemblies are particularly suited for powdered concentrates or other mixes or foodstuffs, held within an integral chamber of a removable cap so that in use, a single container may be utilized to dispense the ultimate product. These containers are characterized by reduced wall thickness, controlled collapsibility to compact configurations which saves significant space not only during shipment but also in in-store displays, inventory, storage, etc. The containers are further characterized by their random collapsibility after use to thereby achieve decreased volumes of post consumer waste.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A collapsible, thin wall, plastic container comprising a closed end, an annular peripheral side wall, an open upper end defined by the top of said side wall, and a removable cap securable to said open end; said annular peripheral side wall having an upper portion adjacent said open upper end, a lower portion adjacent said closed end, and plural intermediate portions between said upper end and said lower end; said cap having a top wall, a radially outer depending skirt, a radially inner depending skirt and a sealable chamber defined by said cap top wall and said inner annular skirt extending downwardly from said top wall to an open lower end closed by a removable seal; said peripheral side wall varying in diameter from said open end to said closed end and including means for enabling axial collapse of the container to a compact, collapsed condition; said means for enabling axial collapse being configured such that a plurality of substantially vertically oriented concentric folds are formed in said plural intermediate portions of said annular peripheral side wall lying radially between remaining uncollapsed upper and lower portions of said annular peripheral side wall when the container is in the collapsed condition, and such that said concentric folds have upper edges substantially level with said cap top wall; said radially inner skirt portion having an axial length substantially corresponding to said concentric folds and said uncollapsed upper and lower portions of said annular peripheral side wall such that said radially inner skirt provides axial support for said container in said collapsed condition; and said radially outer depending skirt having means to secure said cap to said open upper end.

2. The collapsible container of claim 1 wherein said annular peripheral side wall decreases in diameter from said open end to said closed end.

3. The collapsible container of claim 1 wherein said enabling means comprises a plurality of axially spaced annular steps formed in said peripheral side wall, wherein each fold of said plurality of folds is formed at a respective one of said annular steps.

4. The collapsible container of claim 1 wherein said outer depending skirt is formed with screw threads on an interior surface thereof adapted to cooperate with screw threads formed on an exterior surface of said container at said open upper end.

5. The collapsible container of claim 1 wherein said cap wall extends radially outwardly a distance substantially equal to the radial extent of said plurality of substantially concentric folds.

6. The collapsible container of claim 1 wherein said sealed chamber lies inside said container when said cap is secured to said container, said chamber adapted to hold a predetermined amount of solid foodstuff material.

7. The collapsible container of claim 1 constructed of a moderate-to-high temperature polymer.

8. The collapsible container of claim 1 wherein at least a major portion of said peripheral side wall has a thickness in a range of from about 2 to about 12 mil.

9. The collapsible container of claim 1 wherein said annular peripheral side wall increases in diameter from said open end to said closed end.

* * * * *